March 24, 1970 S. F. SAMPSON 3,502,991
SIGNAL GENERATOR WITH ASYNCHRONOUS START
Filed June 19, 1967
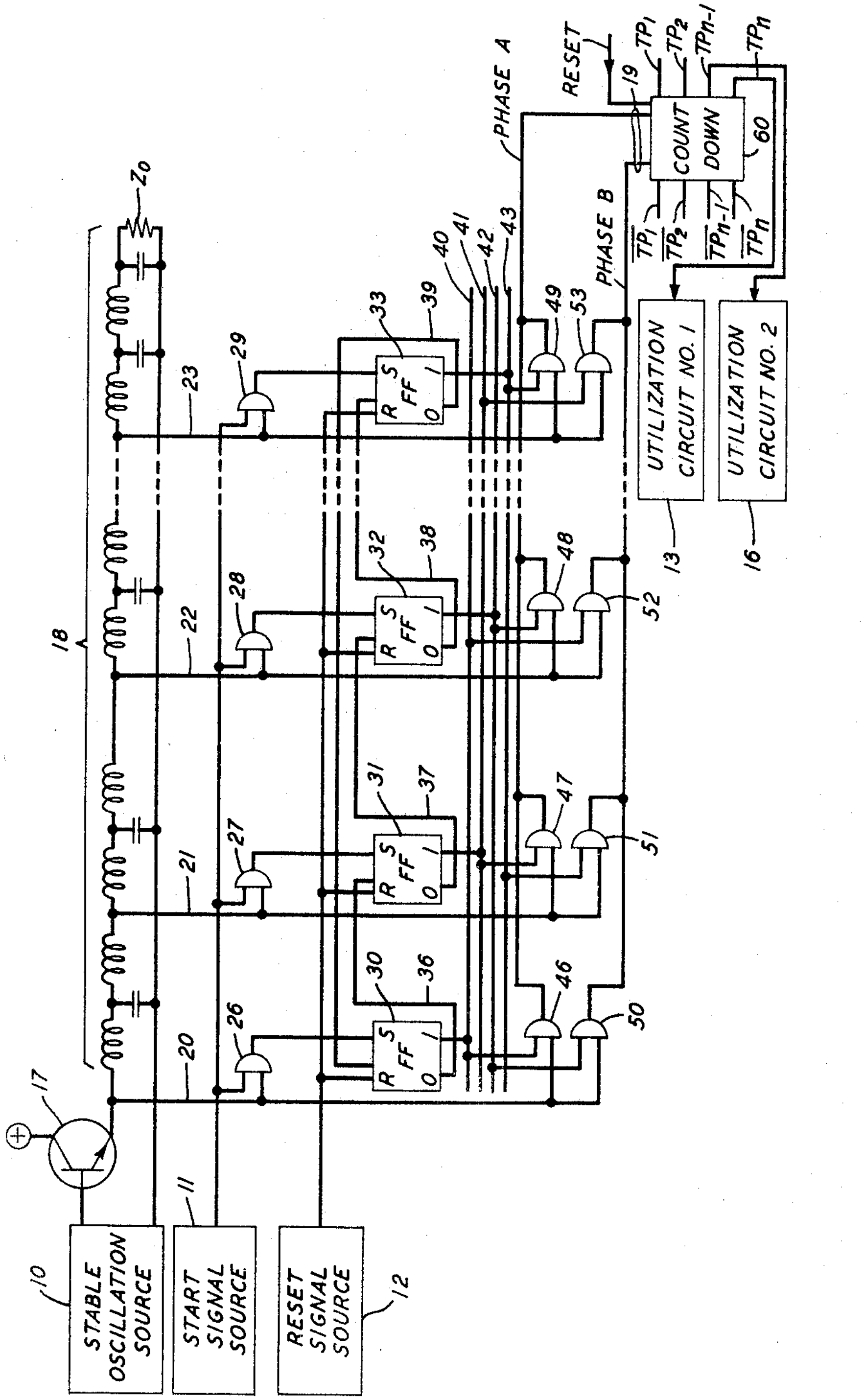
INVENTOR
S. F. SAMPSON
BY
Charles Scott Phelan
ATTORNEY United States Patent Office 3,502,991

Patented Mar. 24, 1970

3,502,991

SIGNAL GENERATOR WITH ASYNCHRONOUS START

Sidney F. Sampson, Glen Ellyn, Ill., assignor to Bell Telephone Laboratories, Incorporated, Murray Hill, N.J., a corporation of New York Filed June 19, 1967, Ser. No. 647,031
Int. Cl. G01r *29/02*
U.S. Cl. 328—130 3 Claims

ABSTRACT OF THE DISCLOSURE

A tapped delay line receiving the output of a stable oscillator has its taps selectably gated through corresponding trigger circuits to an output connection. A trigger signal occurring asynchronously with respect to the oscillator output actuates a selected one of the trigger circuits as a function of the phase relationship between the oscillator output and the trigger signal to establish a circuit path from the oscillator through the selected tap to the output connections. A counting circuit divides down the frequency of signals at the output connections so that a long, asynchronously occurring, time interval can be measured with designably sufficient precision to locate events accurately near either extremity of the interval.

BACKGROUND OF THE INVENTION

This invention relates to the generation of signals and particularly to the generation of such signals after the expiration of an asynchronously initiated time interval.

DESCRIPTION OF THE PRIOR ART

Considerable difficulty has been experienced in the past in accurately controlling events which should be initiated automatically after the expiration of a relatively long, asynchronously initiated, time interval. There are many ways known in the art for measuring long time intervals, but generally the requirements for ease in initiating measurement of an interval and for precision of measurement of long intervals are incompatible with one another. Thus, a highly stable oscillator is a fine means for controlling interval measurement accurately; but such an oscillator is difficult to start asynchronously. Even if one lets the oscillator run continuously and gates its output, certain delays of unpredictable magnitude result because the gate may be opened initially either during an oscillator pulse or during an interpulse interval. In many present day systems long or unpredictable delays cause excessive reductions in the system operating rate.

Most modern computer systems operate in a clock mode. In this mode a predetermined operation is performed in a fixed interval; and a sequence of operations, each taking its required interval, is used to carry out a desired function. Generally, these intervals must be integral multiples of a minimum basic timing interval, i.e., a clock cycle. Hence, if an operation requires any fraction, e.g., a part of a microsecond, of the basic interval, the whole interval must be allocated to that operation.

For example, in certain magnetic memory systems the nature of memory elements requires a write-in interval which is much longer than the read-out interval. To minimize cost it is desirable to use the same timing source to control events for both intervals. For the read-out case, however, it is important to start the read-out process as soon as the input occurs. Thus, an asynchronous mechanism is required that can be started at any random instant. Resistance-inductance-capacitance timing generators possess this instant starting capability, but they are limited in long-term accuracy by unavoidable initial environmental aging degeneration. A large percentage of the normal timing interval must be allowed for these inefficiencies. For long intervals, such as the mentioned memory write-in interval, this percentage margin must be left at the end of the interval. Since the end of such interval may fall at the end of a basic clock cycle, another basic clock cycle must be left for the timing margin before the computer can start a further operation. The sum of these margins, i.e., margin for termination of a function at an intermediate point in a clock cycle and margin for timing uncertainty, can evidently grow excessive. A more precise memory timing source that can be started asynchronously would reduce the margin for timing uncertainty and would also permit more accurate prediction of the end of each operation.

It is, therefore, one object of the invention to measure long time intervals accurately even though they are asynchronously initiated.

It is another object to improve time interval measuring techniques.

A further object is to base time interval measurements on the operation of a continuously running, highly stable oscillator with an output signal repetition period which is longer than the tolerable delay time for interval starting.

SUMMARY OF THE INVENTION

The aforementioned objects and others are realized in an illustrative embodiment wherein a stable oscillator circuit provides signals to output connections through a selectable one of a plurality of circuit paths. Means are provided for selecting one of those circuit paths in response to a triggering signal and as a function of the phase relationship between the oscillator output signal and such triggering signal.

It is one feature of the invention that a tapped delay line couples oscillator signals to the different selectable circuits, each of which circuits includes a coincidence gate that is responsive to the coincidence of the triggering signal and an oscillator pulse at its corresponding delay line tap for completing circuit path selection.

It is another feature that signals at the output connections are counted down to identify a desired part of a measured interval wherein a predetermined event is to be initiated.

DESCRIPTION OF THE DRAWING

A more complete understanding of the invention and its objects and features may be obtained from a consideration of the following detailed description when taken together with the appended claims and the attached single-figure drawing which comprises a diagram, partially in block and line form and partially in schematic form, of a signal generating circuit employing the invention.

DETAILED DESCRIPTION

In the drawing a stable oscillation signal source 10 is continuously operated to provide a constant frequency signal from which control signals may be derived in accordance with the invention. The source 10 is advantageously a crystal controlled oscillator. A start signal source 11 provides signals which are asynchronous with respect to the output of the stable oscillation source 10. Source 11 cooperates with a reset signal source 12 for controlling the circuit in the drawing to produce control signals for two utilization circuits 13 and 16. In a centrally controlled data processing system, for example, the sources 11 and 12 and the circuits 13 and 16 would be interrelated through a central processor, not shown, which is operated in accordance with an instruction program stored in a memory, also not shown. The utilization circuits 13 and 16 advantageously comprise certain of the control circuits for the aforementioned memory. However, details of the interrelationship provided by a processing system for the signal sources and utilization circuits shown in the drawing comprise no part of the present invention and are not required for an understanding of the operating principles of the invention.

Insofar as an understanding of the advantages of the circuit shown in the drawing is concerned, an illustrative memory system application may be briefly noted. Thus, in memories employing elements known in the art as piggyback twistor magnetic memory elements, a long write-in interval is required during which the addressed memory location must not be disturbed. Such interval would be initiated at a time which cannot be predicted by the memory without a detailed analysis of any particular program being run by a processing system in which the memory is located. However, it is known that when such a write-in interval has been started in the piggyback memory, a time interval of 55 microseconds must be allowed to complete internal operations. If resistance-inductance-capacitance timing means were employed, ±10 percent timing margin would have to be allowed for long term timing uncertainties; hence internal memory functions might not be over for 60.5 microseconds after the start of the write-in operation. If the basic system clock cycle were 5.5 microseconds, the next operation would not be initiated until the next termination of an exact multiple of the basic clock interval occurred at 66 microseconds for design safety tolerance. Thus, 10 or more microseconds would be wasted on each write-in operation if resistance-inductance-capacitance timing were employed.

The circuit shown in the drawing eliminates this waste by controlling start and stop points in the timing interval as accurately as desired. The circuit may be designed to initiate the write-in interval within any given delay tolerance from the starting signal, and such tolerance is thereafter always the same regardless of the length of an interval being measured. The length of an interval may be measured as accurately as desired by choosing a sufficiently stable oscillator. Since no appreciable tolerances need to be allowed for timing uncertainties, write-in operations previously requiring 55 microseconds±10 percent can be allocated the lowest time of 49.5 microseconds. Because of the accurate timing capability, a new write-in cycle could be initiated at 49.5 microseconds from the start of the previous write-in interval.

The continuous output of oscillation source 10 is coupled through an emitter follower circuit including a transistor 17 having as the emitter circuit load therein a tapped delay line 18. Only four sections of delay line 18 are shown in order to maintain drawing simplicity for thereby facilitating an understanding of the invention. However, many additional sections are advantageously employed together with their associated tap circuits. The delay line is terminated in its characteristic impedance $Z_0$ and has an electrical length which is sufficient to store output signals from the oscillation source 10 for a time interval which is sufficient to store output signals from the oscillation source 10 for a time interval which is at least equal to the repetition period of such signals.

The sections of the delay line 18 and the respective tap circuits associated therewith, as will be described, comprise plural, selectable, gated, circuit paths for coupling the output of oscillation source 10 to output connections 19. Four delay line taps 20, 21, 22, and 23 are shown for coupling the various delay line portions into the aforementioned selectable circuit paths. Additional delay line sections are schematically represented by the broken-line portions of delay line 18 and of corresponding circuits to be described. The number of taps provided is determined by the frequency of output signals from source 10 and the maximum tolerable delay time for starting the measurement of any particular time interval.

A first set of coincidence gates including the gates 26–29 each receives at one of its inputs signals from a different one of the delay line taps 20–23, respectively. The gates 26–29 also receive at another input connection for each of them the output of start signal source 11. Each of the gates is schematically represented as a semicircle in a fashion well known in the art and includes all power supply and ground return connections which are necessary for any particular type of coincidence gate connection which is employed. This convention for a function plus power supply and ground return is similarly employed for other circuit elements shown in the drawing by a particular schematic representation for indicating a certain type of circuit function that can be produced by a wide range of circuits which are well known in the art.

In the embodiment of the drawing, the length of delay line 18 is shown so that no more than one pulse from source 10 appears at any given time in a delay line portion to which the taps 21–23 are connected. Additional sections of the line beyond one period of source 10 would be redundant and would be employed if the increased reliability warrants the extra cost. Upon the occurrence of a start signal from source 11, any gate in the set including the gates 26–29, which simultaneously has at an input connection thereof a pulse coupled from the delay line 18, is opened for coupling a signal to the output of such gate circuit. Thus, the time resolution achieved is a function of the number and spacing of taps along the delay line 18.

The outputs of the gates 26–29 are applied to set input connections of respective bistable trigger circuits 30–33. However, each bistable circuit has an interlocking connection from its binary ZERO output to the reset input connection of the next bistable circuit in the sequence of taps along the delay line 18. The binary ZERO output of the bistable circuit 33 is looped around to the reset input connection of the bistable circuit 30. These resetting interlock connections 36–39 permit only one bistable circuit at a time to remain in the stable set state. Thus, where known low level logic circuits are employed for implementing the connections of FIG. 1, the bistable circuits are input-signal-level responsive; and if two bistable circuits receive set signals from their respective delay line taps, the second one in the sequence of signal transmission along line 18 also receives a reset signal from the first bistable circuit. Consequently, such second bistable circuit does not assume either stable state until the start signal has ended, and then it is controlled by its reset input signal.

Of course, if a delay line pulse could span more than two taps during a start pulse, the resetting interlock connections for each bistable circuit include OR logic (not shown) to make the interlock responsive to the set state of an appropriate number of preceding bistable circuits in the delay line tap sequence.

The binary ONE output of each of the bistable circuits 30–33 is connected to a different gate-selecting bus 40–43, respectively. Each gate selecting bus is further connected to an input of one gate in each of two further sets of coincidence gates 46–49, respectively, and 50–53, respectively. Each of the gate sets has in the illustrated embodiment a separate output lead, that is common to all gates of the set, in the output connections 19. Thus, the gates 46–49 are all connected to a phase A lead in the ouput connections 19, and the gates 50–53 are all connected to a phase B lead. Each of the gate sets 46–49 and 50–53 includes a different coincidence gate having an input connected to each corresponding tap of delay line 18. Thus, for example, the gates 46 and 50 have an input connected to the corresponding delay line tap 20, which is also coupled through the corresponding gate 26 to the set input of bistable circuit 30.

The pair of gates which are connected to any one bus in the output of a bistable circuit are respectively connected to different delay line taps electrically spaced a predetermined distance along the delay line 18. In the illustrated embodiment the spacing is advantageously a half period of the output of source 10. Consequently, the setting of one of the bistable circuits 30–33 enables two gates so that each output pulse from the oscillation source 10 is converted in the output connections 19 to phase A and phase B pulse forms, respectively. Although the broken-line portions of circuits such as delay line 18, buses 40–43, and circuits 19 suggest iterative delay line sections and connections thereto, the connections to gates 46–53 are not strictly iterative because each has different connection to the correspondinv delay line tap 20, which line 18 would have connections similar to those shown and including an additional gate-selecting bus.

Summarizing the operation of the circuit of the drawing as considered so far, assume that an output pulse from the oscillation source 10 appears on delay line 18 overlapping the taps 21 and 22 at the time of the occurrence of an active start signal from the source 11. Gates 27 and 28 in the first set are opened to couple setting signals to bistable circuits 31 and 32. When the start signal falls inactive again, the binary ZERO output on lead 37 forces the bistable circuit 32 to its reset state. An active output signal appears on the binary ONE output of only the bistable circuit 31; such signal is coupled through the gate selecting bus 41 to input connections of gate 47 in the second set of coincidence gates and gate 53 in the third set of coincidence gates. A signal is designated "active" or "inactive" depending upon whether or not it is of a character needed to activate the function of the particular type of logic circuit employed. Thus, for example, if bistable circuits are used that require a positive level for triggering, a trigger signal is active when it is positive and inactive when it is at ground.

The pulse from oscillation source 10 is coupled through tap 21 and the now-enabled gate 47 to the phase A lead of the output connections 19. Subsequently the pulse from source 10 reaches tap 23 and is applied through the similarly enabled gate 53 to the phase B lead in output connections 19. The two differently phased circuit paths through gates 47 and 53 for output signals from source 10 are maintained as long as the bistable circuit 31 remains in its set condition. The occurrence of the start signal at a differently phased time with respect to the output of source 10 would have established a different set of circuit paths to output connections 19 in a similar manner as a function of the phase relationship between the start signal and the oscillator output at the time of start signal appearance.

It is to be understood, of course, that in embodiments wherein only a single output phase is desired, or wherein more than two output phases are desired, appropriate changes of a straightforward nature must be made in the number of sets of coincidence gates controlled by the bistable circuits.

Output connections 19 are applied to input connections of any suitable countdown circuit 60 for dividing down the frequency of signals in connections 19. This circuit is advantageously a ring counting arrangement of the double rank type with coincidence gates coupling the binary ONE output of each stage except the last to the set input of the following stage and coupling the binary ZERO output of each stage except the last to the reset input of the following stage. The ZERO and ONE outputs of the last stage are coupled to the set and reset inputs, respectively, of the first stage. Alternate gates on the setting side are actuated by phase A signals, and intermediate gates are actuated by phase B signals. The alternate and intermediate gates on the resetting side are actuated by phase B and phase A, signals, respectively, so that both phase A and phase B portions of signals on circuits 19 are counted in the signal counting circuit.

As a count state progresses through the countdown circuit 60, TP output signals are provided at the respective binary ONE output connections of the different stages, and $\overline{TP}$ signals are similarly provided at the binary ZERO output connections. As illustrated in the drawing, the arrival of such count state at the $TP_{n-1}$ connection provides an enabling signal to the utilization circuit 16 to initiate its operation. The subsequent arrival of the counting state at the $TP_n$ output connection provides an actuating signal to the utilization circuit 13. The $TP_n$ signal is also advantageously employed to actuate reset signal source 12 for resetting bistable circuits 30–33 and countdown circuit 60. If the illustrated circuit is employed in a memory system the reset signal can be provided either at the end of the write-in interval or just prior to a succeeding read-out operation. In either case the source 12 can be actuated to produce the signal by an output of the countdown circuit 60 or by some other control source in the system.

The circuits 13 and 16 are actuated in close succession after an interval which is precisely regulated by the frequency of the oscillation source 10. The latter source controls the stepping of the countdown circuit 60 independently of impedance-element-controlled measured time intervals. The delay line 18 produces certain delays as a function of impedance elements which are subject to the usual factors of aging, environmental conditions, and the like. However, such factors have no significant effect over any single operating interval defined by the time intervening between a start signal from source 11 and a reset signal from source 12. Over long periods of time there may be certain changes in the characteristics of delay line 18, but these are automatically accommodated by the previously described circuitry which causes the signals from source 11 to select for actuation a circuit path corresponding to whatever position a pulse may have in the delay line 18 in a real time sense and independently of any phase relationship to a system time base.

Although the invention has been described in connection with a particular embodiment thereof, it is to be understood that additional embodiments and modifications which will be obvious to those skilled in the art are included within the spirit and scope of the invention.

What is claimed is:

1. In combination, a continuously operating oscillator providing a train of pulses, means supplying a triggering signal asynchronously with respect ot the output of said oscillator, a tapped delay line coupled to an output of said oscillator and having a total delay which is at least equal to the repetition period of the output of said oscillator, first and second sets of coincidence gates each of said sets of gates including a separate gate corresponding to a different tap of said delay line, means connecting each said different tap to an input of each of a corresponding gate in each of said first and second sets of gates, a plurality of further coincidence gates each connected to receive said triggering signal and an output of a different tap of said delay line, a plurality of trigger circuits each connected to receive an output of a different one of said further coincidence gates, means connecting an output of each of said trigger circuits to an input of the corresponding gate in said first set, which gate is coupled to the same tap of said delay line as is the gate connection including such trigger circuit, means further connecting said output of each of said trigger circuits to an input of a gate in said second set, which gate is coupled to a different one of the taps of said delay line than is such trigger circuit, first and second output circuits coupled to all of the outputs of said first and second sets of coincidence gates, respectively, and means applying said triggering signal to actuate said further coincidence gates for causing application of pulses through gates of said first and second sets to said output circuits from said oscillator, which pulses applied through a first set gate have substantially the same phase relationship with respect to pulses in the output of said oscillator as said triggering signal had with respect to pulses in the output of said oscillator.

2. The combination in accordance with claim 1 in which frequency dividing means are coupled to said output circuit means for providing at least two output signals at different times in response to the coupling of an initial pulse from said oscillator to said output circuit means.

3. The combination in accordance with claim 1 which comprises in addition first and second utilization circuits, means coupling the first occurring one of said two output signals to said first utilization circuit, and means coupling the second occurring one of said output signals to said second utilization circuit, said first and second output signals being separated from one another by an interval which is substantially smaller than the interval between either of such signals and the initial application of a pulse from said output circuit means to said frequency dividing means.

References Cited

UNITED STATES PATENTS

| | | | |
|---|---|---|---|
| 2,403,561 | 7/1946 | Smith | 328—97 X |
| 2,867,722 | 1/1959 | Little | 328—105 |
| 3,024,417 | 3/1962 | Secretan | 328—56 X |
| 3,304,504 | 2/1967 | Horlander | 328—72 |

JOHN S. HEYMAN, Primary Examiner

U.S. Cl. X.R.

307—293; 328—56, 72, 97, 105